United States Patent
Kumano et al.

(10) Patent No.: US 7,222,174 B2
(45) Date of Patent: May 22, 2007

(54) MONITORING CONTROL NETWORK SYSTEM

(75) Inventors: Satoshi Kumano, Kawasaki (JP); Hideki Maeda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 711 days.

(21) Appl. No.: 10/386,810

(22) Filed: Mar. 5, 2003

(65) Prior Publication Data

US 2003/0158623 A1 Aug. 21, 2003

Related U.S. Application Data

(63) Continuation of application No. PCT/JP00/06020, filed on Sep. 5, 2000.

(51) Int. Cl.
G06F 15/173 (2006.01)
G06F 15/16 (2006.01)
G06F 15/177 (2006.01)

(52) U.S. Cl. ..................... 709/224; 709/223

(58) Field of Classification Search .............. 709/224, 709/223, 227
See application file for complete search history.

(56) References Cited

U.S. PATENT DOCUMENTS

| 6,578,088 B2* | 6/2003 | Ohno et al. ............. 709/245 |
| 6,810,496 B1* | 10/2004 | Vittal ...................... 714/57 |
| 6,915,342 B1* | 7/2005 | Motoyama ............... 709/224 |
| 2003/0126240 A1* | 7/2003 | Vosseler .................. 709/221 |
| 2003/0158623 A1* | 8/2003 | Kumano et al. ......... 700/213 |

FOREIGN PATENT DOCUMENTS

| JP | 62-57339 | 3/1987 |
| JP | 3-096028 | 4/1991 |
| JP | 8-340333 | 12/1996 |

* cited by examiner

Primary Examiner—Rupal Dharia
Assistant Examiner—Brian J. Gillis
(74) Attorney, Agent, or Firm—Katten Muchin Rosenman LLP

(57) ABSTRACT

A monitoring control network system has at least two monitoring control devices each having at least one monitored device as a slave configuring a network, and monitoring and controlling the slave monitored device, at least one operation terminal monitoring and controlling the corresponding slave monitored device through the monitoring control device, and at least one monitoring target management server including a storage unit storing monitoring target information representing a couple of information for specifying each of the monitored devices and information for specifying each of the monitoring control devices monitoring and controlling the monitored devices, and a notifying unit accepting an acquisition request of the specifying information of the monitoring control device from the operation terminal, and notifying the operation terminal of the specifying information of the monitoring control device with the designated monitored device set as a monitoring target.

8 Claims, 11 Drawing Sheets

| MONITORING TARGET MANAGEMENT SERVER ADDRESS |
|---|
| MONITORING TARGET MANAGEMENT SERVER ADDRESS |
| MONITORING TARGET MANAGEMENT SERVER ADDRESS |
| ⋮ |

MONITORING TARGET MANAGEMENT SERVER INFORMATION

| MONITORED DEVICE ID#1 | MONITORED DEVICE NAME#1 | MONITORING CONTROL DEVICE ADDRESS |
|---|---|---|
| MONITORED DEVICE ID#2 | MONITORED DEVICE NAME#2 | MONITORING CONTROL DEVICE ADDRESS |
| MONITORED DEVICE ID#3 | MONITORED DEVICE NAME#3 | MONITORING CONTROL DEVICE ADDRESS |
| ⋮ | ⋮ | ⋮ |

MONITORING TARGET INFORMATION

FIG. 6

MONITORING TARGET MANAGEMENT SERVER INFORMATION  201

| 192.168.0.2 |
|---|
| 192.168.0.101 |

MONITORING TARGET INFORMATION  101

| 001 | NE#001 | 192.168.0.101 |
|---|---|---|
| 002 | NE#002 | 192.168.0.102 |
| 101 | NE#101 | 192.168.0.102 |
| 200 | NE#200 | 192.168.0.101 |

MONITORING CONTROL NETWORK SYSTEM

This application is a continuation of international application number PCTJP00/06020, Sep. 5, 2000

BACKGROUND OF THE INVENTION

The present invention relates to a monitoring control network system enabling a load distributed management of monitoring and controlling monitored devices under a monitoring control device from an operation terminal and a monitoring target management server.

With expansions of information communication networks, there arises a necessity of monitoring the monitored devices in distribution in a way that installs a plurality of monitoring control devices for monitoring the monitored devices such as transmission devices serving as network component devices, corresponding to every type and every disposition area of the monitored devices.

A conventional monitoring control network system adopts an architecture as shown in FIG. 1 in order to monitor and control all or a part of monitored devices within a network.

Namely, (1) operation terminals (an operation terminal for A, an operation terminal for B) are installed corresponding to monitoring control devices A, B, respectively. (2) One operation terminal exists, a suite of software (software for A, and software for B) is provided for the respective monitoring control devices, and an operator switches over this suite of running software or a connecting destination. (3) There is provided an integrated monitoring server, connected to all or a plurality of monitoring control devices, for managing batch wise (centralized management) states of monitored devices a1, a2, b1, b2 and pieces of information thereof, and the operation terminal is connected to this integrated monitoring server.

The architecture of the conventional monitoring control network system described above has the following problems. The architecture (1) given above requires the operation terminal for every monitoring control device, with the result that the cost increases and a larger installation area is needed. Further, the operator needs t operate each operation terminal in order to see necessary items of information, and hence an operability declines.

In the architecture (2) described above, when switching over the suite of software for the monitoring control, connections to the plurality of monitoring control devices can not be simultaneously established, and it is therefore impossible to see the necessary items of information at one time. Moreover, in a case where plural pieces of software can be booted simultaneously, this requires a large quantity of resources (a memory, a disk capacity etc) of the operation terminal, and consequently the cost rises.

Further, though it is also the same with the architecture (1), the operator needs to be aware of which monitoring control device monitors the monitored device and which monitored device is monitored by it, and hence this becomes a factor for a decline of the reliability.

The architecture (3) given above requires providing the integrated monitoring server separately from the monitoring control device, and therefore the cost increases. Moreover, the integrated monitoring server is connected to all the monitoring control devices and unitarily manages pieces of information on the monitored devices. Hence, there is a possibility of causing discordance with the information held by each f the monitoring control devices, resulting in the decline of the reliability. Avoidance of this problem involves a complicated scheme so as not to cause the discordance. Further, the information is converged eventually to one single device (the integrated monitoring server), and therefore it follows that the load is concentrated on the integrated monitoring server.

SUMMARY OF THE INVENTION

It is an object of the present invention to provide a monitoring control network system enabling a load distributed management of monitoring and controlling monitored devices under a monitoring control device from an operation terminal and a monitoring target management server.

It is another object of the present invention to provide a monitoring control network system that enables monitoring and controlling the monitored devices under the monitoring control device without bringing about a decline of reliability.

It is a further object of the present invention to provide a monitoring control network system that enables monitoring and controlling the monitored devices under the monitoring control device without a decline of operability of an operation terminal, an increase in cost for equipment of the operation terminal or a rise in load on an operator.

To accomplish the above objects, a first monitoring control network system of the present invention has at least two monitoring control devices each having at least one monitored device as a slave configuring a network, and monitoring and controlling the slave monitored device, at least one operation terminal monitoring and controlling the corresponding slave monitored device through the monitoring control device, and at least one monitoring target management server including a storage unit storing monitoring target information representing a couple of information for specifying each of the monitored devices and information for specifying each of the monitoring control devices monitoring and controlling the monitored devices, and a notifying unit accepting an acquisition request of the specifying information of the monitoring control device from the operation terminal, and notifying the operation terminal of the specifying information of the monitoring control device with the designated monitored device set as a monitoring target, wherein the operation terminal performs communications with the monitoring control device acquired through the notification, and executes monitoring and controlling the specified monitored device.

In this architecture, the monitoring control device, the operation terminal and the monitoring target management server may be connected to each other via the same network. Further, the monitoring control device, the operation terminal and the monitoring target management server may be connected to each other via a plurality of networks.

In a second monitoring control network system of the present invention, the monitoring target management server may further include a notifying unit accepting the acquisition request of the specifying information of the monitored device from the operation terminal in order to make a monitoring and controlling target selectable in the operation terminal, and notifying the operation terminal of the specifying information of the slave monitored device set as the monitoring target by the designated monitoring control device on the basis of the monitoring target information.

In a third monitoring control network system of the present invention, the monitoring target management server may further include a notifying unit accepting the acquisition request of the specifying information of all of the monitoring control devices from the operation terminal in order to enable the operation terminal to perform communications with an arbitrary monitoring control device, and notifying the operation terminal of the specifying information of all of the self-governed monitoring control devices.

In a fourth monitoring control network system of the present invention, at least one of the monitoring target management server may be provided in the monitoring control device.

In a fifth monitoring control network system of the present invention, the operation terminal may include a storage unit storing specifying information of the monitoring target management server, and an acquisition unit acquiring from the storage unit a piece of specifying information of the monitoring target management server.

In a sixth monitoring control network system of the present invention, the operation terminal may further include an acquisition unit acquiring from the storage unit, if a request for one of the monitoring target management servers falls into a failure, a piece of specifying information of other monitoring target management server to which the request is to be given next.

According to the present invention, the monitoring control network is provided with the monitoring target management server, and the monitoring target management server holds the monitoring target information representing the couple of the information for specifying the monitored device and the information for specifying the monitoring control device for monitor-controlling each monitored device, whereby the operation terminal can acquire the specifying information of the monitored device from the monitoring target management server even when holding no such specifying information, and a distributed management of monitoring and controlling the control devices can be attained.

Further, according to the present invention, the monitoring target management server has a function of acquiring the specifying information of the monitored device set as a monitoring target of the specified monitoring control device and a function of acquiring the specifying information all the monitoring control devices, and is therefore capable of executing, even when the respective pieces of specifying information are not retained on the operation terminal, the same processing.

This scheme is, even if the network architecture is changed such as changing addresses of the monitored devices and of the monitoring control devices and so on, capable of corresponding to this architectural change only by changing the storage information within the monitoring target management server, thereby facilitating the change in architecture. Moreover, neither the operator nor the operation terminal has the necessity of being aware of the specifying information described above, thereby relieving the load.

Furthermore, according to the present invention, the number of the component devices added can be restricted by providing the monitoring control device with the monitoring target management server, and therefore this is advantageous in terms of cost performance and enables significant distributed monitoring.

BRIEF DESCRIPTION OF THE DRAWINGS

The foregoing and other features and advantages of the present invention will become more readily appreciated as the same becomes better understood by reference to the following detailed description when taken into conjunction with the accompanying drawings wherein:

FIG. 4 is a diagram showing an example of a structure of monitoring target management server information;

FIG. 5 is a diagram showing an example of a structure of monitoring target information;

FIG. 6 is a diagram showing specific examples of the monitoring target management server information and of the monitoring target information;

DETAILED DESCRIPTION OF THE PREFERRED EMBODIMENTS

Next, an embodiment of the present invention will be described with reference to the drawings.

[Architecture of Monitoring Control Network System]

Figure 1:
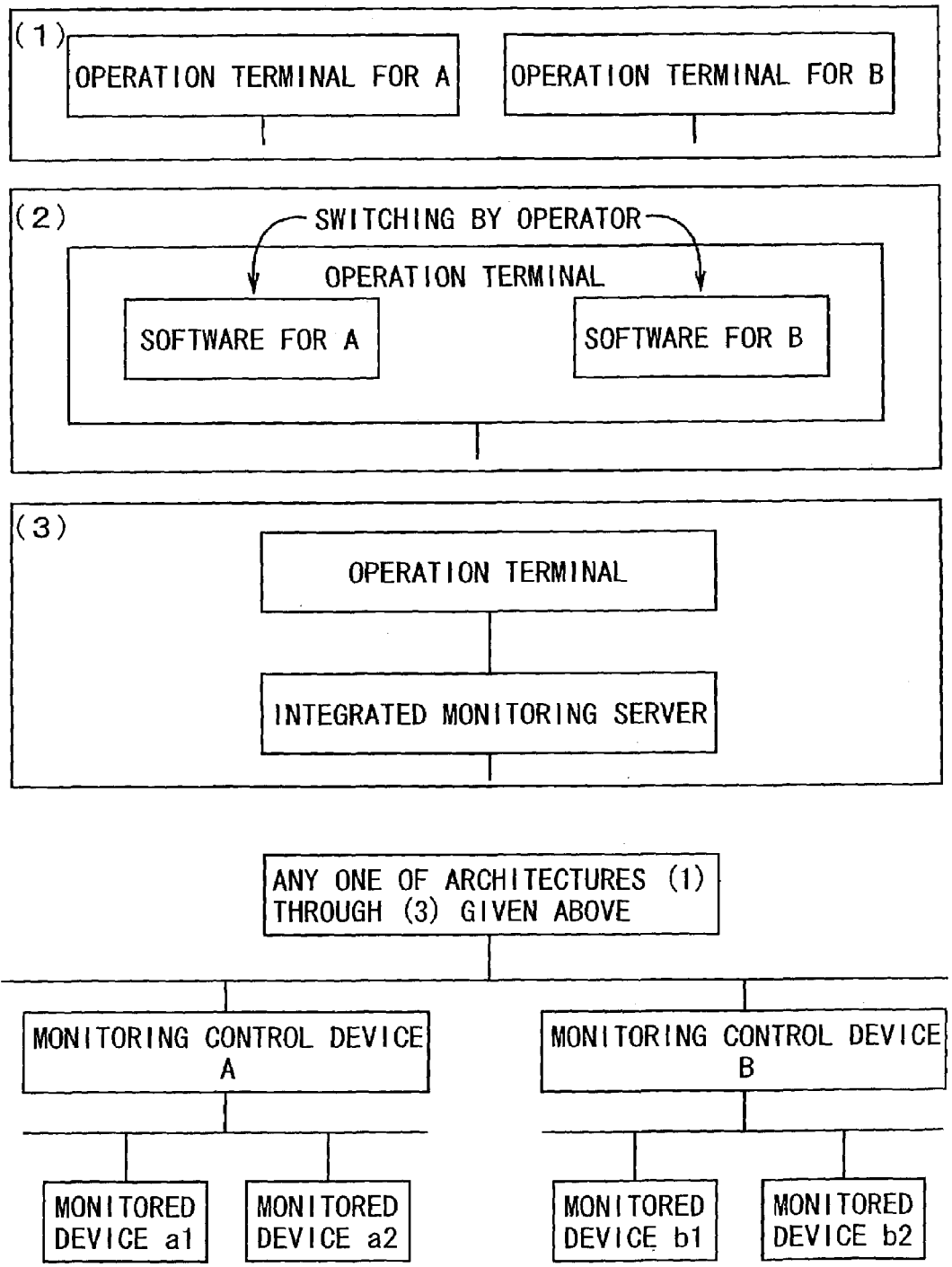
FIG. 1 is a block diagram showing an example of an architecture of a conventional monitoring control network system.
Figure 2:
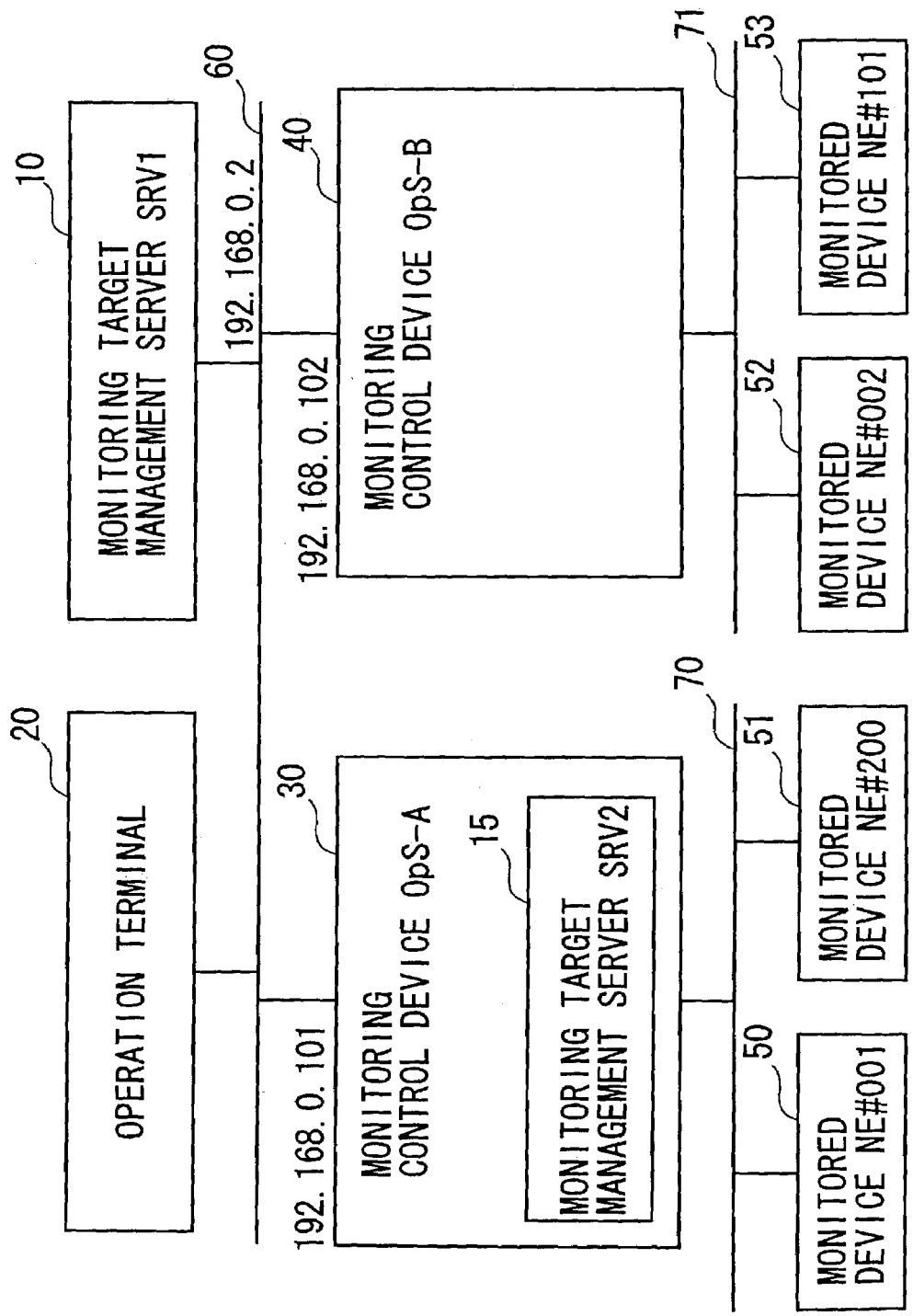
FIG. 2 is a block diagram showing an example of an architecture of a monitoring control network system in one embodiment of the present invention.
Figure 3:
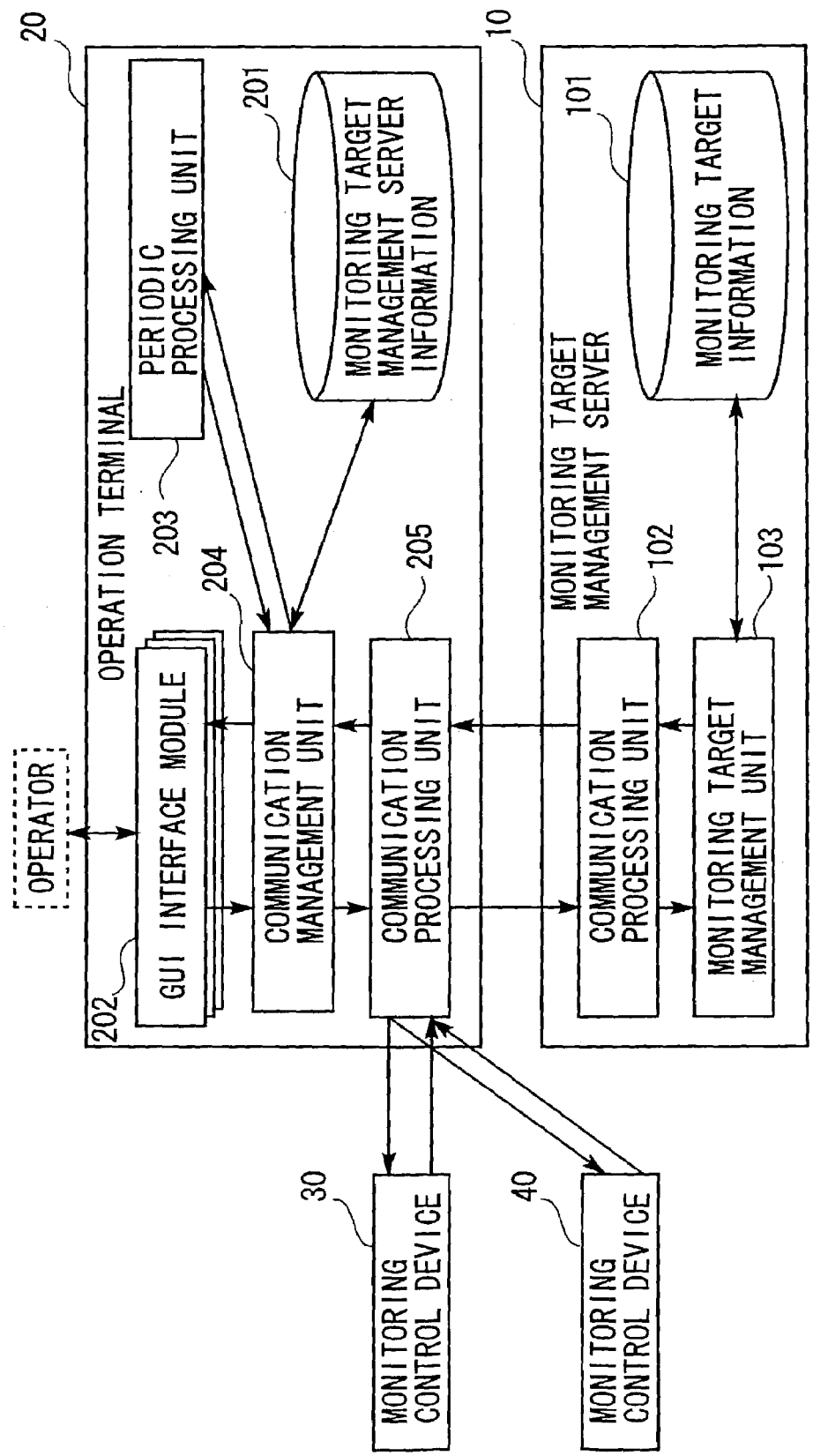
FIG. 3 is a block diagram showing an example of detailed configurations of an operation terminal and of a monitoring target management server in FIG. 2.
Figure 7:
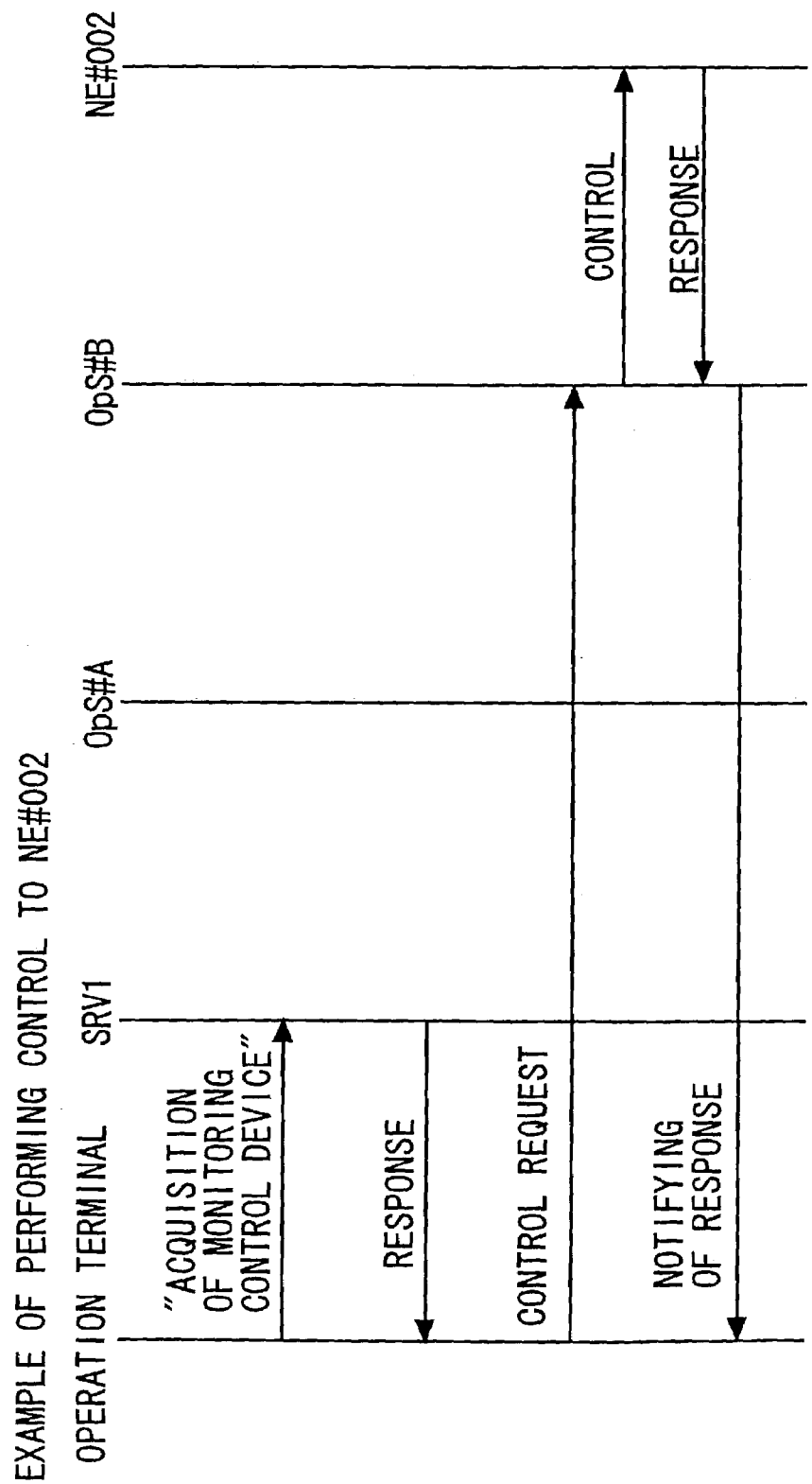
FIG. 7 is an explanatory sequence chart showing an operation of the monitoring control network system in one embodiment of the present invention.
Figure 8:
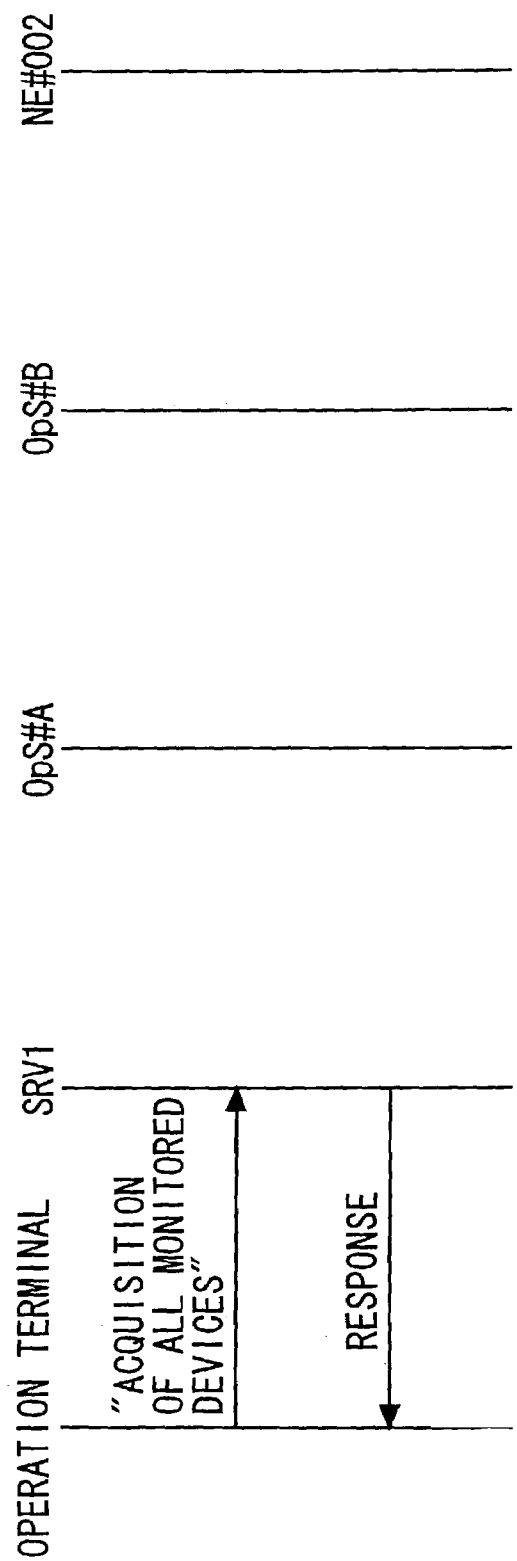
FIG. 8 is an explanatory sequence chart showing the operation of the monitoring control network system in one embodiment of the present invention.
Figure 9:
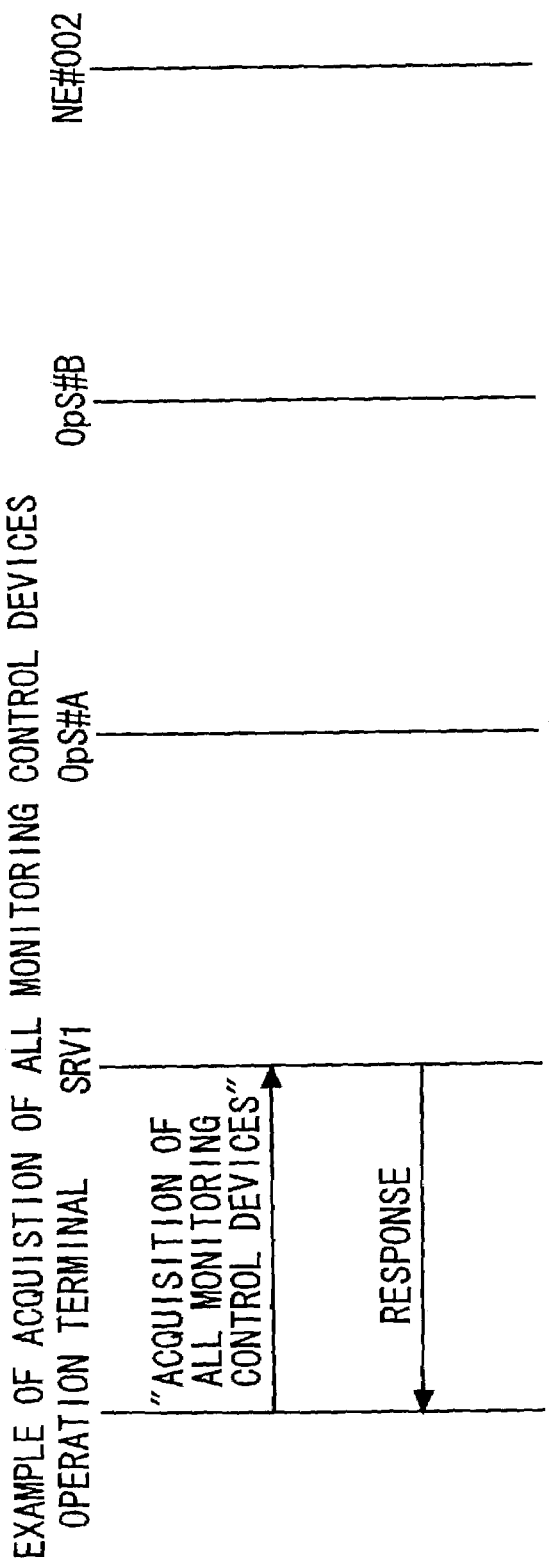
FIG. 9 is an explanatory sequence chart showing the operation of the monitoring control network system in one embodiment of the present invention.
Figure 10:
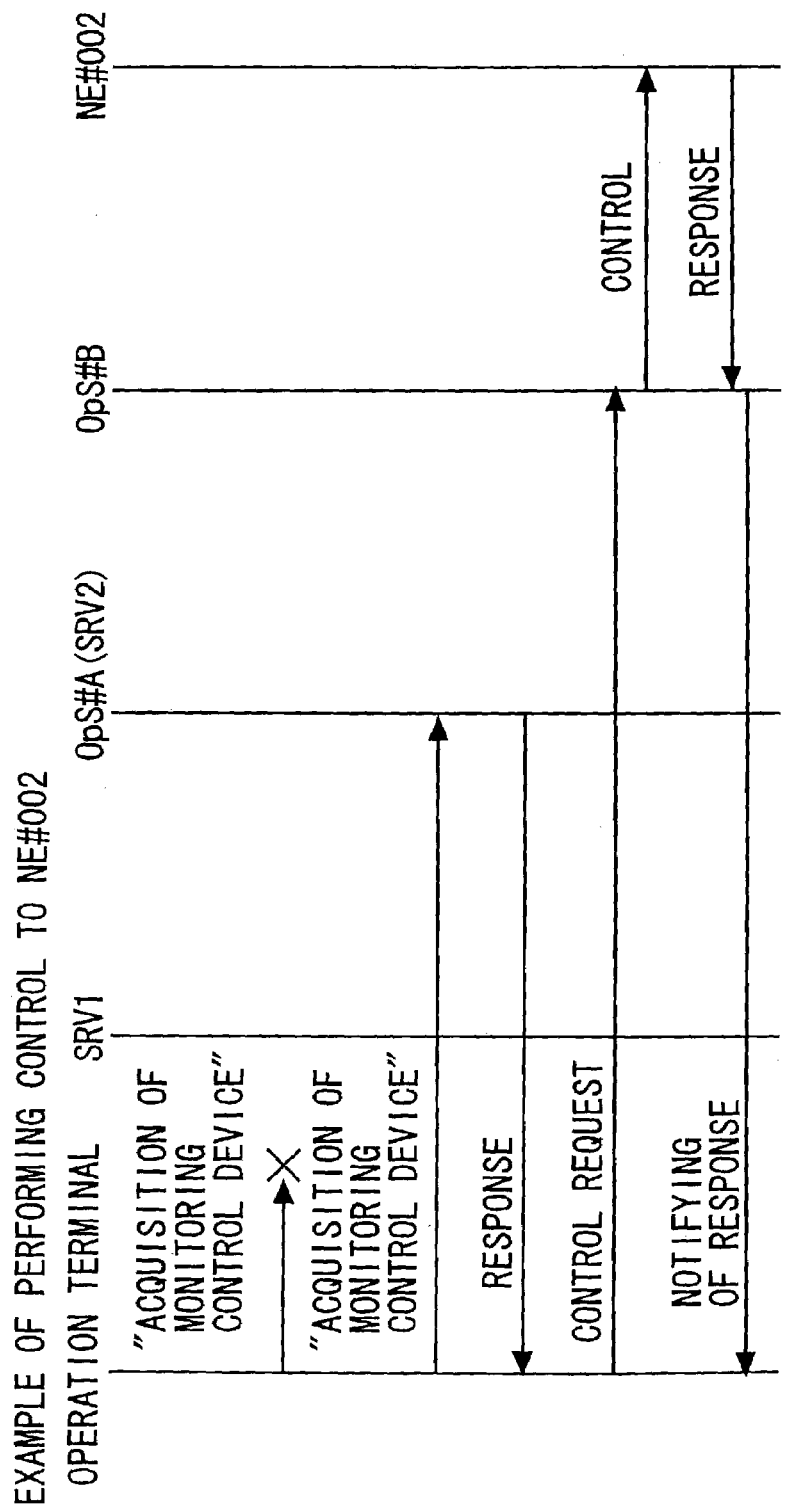
FIG. 10 is an explanatory sequence chart showing the operation of the monitoring control network system in one embodiment of the present invention.

FIGS. 2 and 3 show an architecture in one embodiment of the present invention. Referring to FIGS. 2 and 3, a monitoring control network system is provided with a monitoring target management server 10 that is individually disposed. Further, a monitoring target management server 15 having the same architecture and function as those of the monitoring target management server 10, is provided as a server function unit in a monitoring control device 30. The monitoring target management server 15 has a redundant architecture with respect to the monitoring target management server 10, and functions when the monitoring target management server 10 falls into a fault.

This monitoring target management server (which will hereinafter simply called a server as the case may be) 10 includes a storage unit 101 for storing pieces of monitoring target information, a communication processing unit 102 and a monitoring target management unit 103.

The storage unit 101 is, as shown in FIG. 5, stored in a table format with, as pieces of monitoring target information, identifiers (ID#1, ID#2, ID#3 . . . ) of all the monitored devices within this monitoring control network system, names (#1, #2, #3 . . . ) of all the monitored devices and specifying information (address information in this example) of corresponding monitoring control devices for monitor-controlling the monitored devices thereunder.

A specific example of the monitoring target information stored on in the storage unit 101 will be, though shown in FIG. 6, explained in detail later on. Note that the identifier (ID) of the monitored device in the monitoring target information is set for a convenience of searching but is not indispensable information.

The communication processing unit 102 controls an interface with a local area network (LAN) 60 such as Ethernet based on TCP/IP (Transmission Control Protocol/Internet Protocol) protocol, notifies the monitoring target management unit 103 of the communication information received from the operation terminal 20, and sends, as a response, transmission information of which a transmission is requested by the monitoring target management unit 103 back to the operation terminal 20 receiving a request via a line of the LAN 60.

The monitoring target management unit 103 searches, based on the request from the operation terminal 20 that the communication processing unit 102 has notified of, the monitoring target information preset in the storage unit 101, and sends as a response the address information of the monitoring control device with a designated monitored device serving as a monitoring control target back to the communication processing unit 102.

Further, the monitoring target management unit 103 has a first notifying function of searching the monitoring control device for monitor-controlling the designated monitored device and notifying the communication processing unit 102 of it on the basis of the request given from the operation terminal 20, a second notifying function of notifying of the specifying information (IDs and names of the devices) of all the monitored devices 50, 51, 52, 53, and a third notifying function of notifying of the specifying information (address information) of all the monitoring control devices 30, 40.

In this monitoring control network system, the operation terminal 20 includes a storage unit 201 for storing address information as information (monitoring target management server information) for specifying the monitoring target management server 10, a GUI (Graphical User Interface) module 202, a periodic processing unit 203, a communication management unit 204 and a communication processing unit 205.

The storage unit 201 is, as shown in FIG. 4, stored with address information of the monitoring target management servers 10, 15 within this monitoring control network system as monitoring target management server information. A specific example of the address information as the monitoring target management server information stored in the storage unit 201 will be, though shown in FIG. 6, explained in depth later on.

The GUI interface module 202 has a graphical user interface for accepting a request from an operator, and notifies the communication management unit 204 of a content of processing accepted. Further, the GUI inter module 202 notifies the operator of response information by characters, graphics, buzzer etc that the communication management unit 204 has notified of.

The periodic processing unit 203 executes a next process at an interval of predetermined fixed time (interrupt request). Namely, the periodic processing unit 203 issues a command for confirming by polling whether the monitoring control devices 30, 40 are in an operable state or not. Further, the periodic processing unit 203 collects, as a state information collection, occurrences of states such as an alarming state and switching (line switching etc) state etc of the monitored device designated as the monitoring control target by the operation terminal.

The communication management unit 204 executes a next process upon accepting a request from the GUI interface module 202 or the periodic processing unit 203. The communication management unit 204, in the case of the control request with respect to the monitored device, requests the monitoring target management server 10 to acquire the address information of the monitoring control device with the concerned monitored device set as the monitoring target, and transmits a content of the transmission request from the GUI interface module 202 to the acquired address information of the monitoring control device. The communication management unit 204 notifies the GUI interface module 202 of a content of the response when receiving the response.

The communication management unit 204, in the case of requesting the monitoring control device, requests the monitoring control device to transmit the information requested, and notifies the GUI interface module 202 or the periodic processing unit 203 of the response information.

Moreover, the communication management unit 204 has a first acquisition function of acquiring the server 10 that is asked for the request on the basis of the address information, a monitoring control function of monitor-controlling the monitored device by use if the address information of the monitoring control device as a target of which the server 10 has notified, and a second acquisition function of searching for, if the communication with the server 10 falls into a failure, again the address information of the server 10 and acquiring the server 10 to which the request should be issued based on a predetermined rule.

The communication processing unit 205 controls an interface with the LAN 60, transmits the transmission information requested by the communication management unit 204 to the server 10 or the monitoring control devices 30, 40 via the line of the LAN 60, and notifies the communication management unit 204 of the information received.

The two pieces of monitoring control devices 30, 40 are connected via the LAN 60 to the above-mentioned monitoring target management server 10 and the operation terminal 20, and perform distributed management (monitoring control) of the monitored devices 50, 51, 52, 53 thereunder. The monitored devices 50, 51 under the monitoring control device 30 are connected to the monitoring control device 30 via a LAN 70 such as Ethernet etc. Further, the monitored devices 52, 53 under the monitoring control device 40 are connected to the monitoring control device 40 via a LAN 71 such as Ethernet etc.

The following processes are periodic processes executed by the monitoring control devices 30, 40 with respect to the monitored devices 50, 51, 52, 53. The monitoring control devices 30, 40 have a periodic process function. The monitoring control devices 30, 40 periodically issue, as a periodic collection function, a command (which is normally an NOP command) in order to confirm by polling that the monitored device thereunder operates.

Further, the monitoring control devices 30, 40 periodically collect, as a periodic collection function, a variety of states (such as an occurrence state of alarming, a switching state of the line and a path due to a fault, a state of quality of the line and so on) of the monitored devices there under. The monitoring control devices 30, 40 periodically set, as a periodic collection function, a date/time of the monitored devices thereunder.

Moreover, the monitoring control devices 30, 40 acquire, as an architecture information acquisition function, when the monitoring control device connects to the monitored devices for the first time such as starting up the monitoring device, architecture information of the monitored devices, which is required for monitor-controlling thereafter.

[Operations of Monitoring Control Network System]

Next, various operations of the monitoring control network system taking the architecture described above in one embodiment of the present invention, will be explained.

FIRST OPERATIONAL EXAMPLE

Referring to FIGS. 2, 3, 6 and 7, in the operation terminal 20, the GUI interface module 202 or the periodic processing unit 203 for time setting etc notifies, in the case of performing the control etc, the communication management unit 204 of an ID of the target monitored device and a content of the request.

The communication management unit 204 acquires, based on the monitoring target management server information stored on the storage unit 201, the address information (that is network address information in this example) of the monitoring target management server 10 in accordance with the predetermined rule such as acquiring according to a storage sequence or a priority, and requests the communication processing unit 205 to acquire a specified piece of information (which is the network address information in this example) of the monitoring control device on the basis of the acquired address information (a first acquisition function). Note that the specified information of the server 10 is not limited to the address information such as the network address etc and may be whatever is specifiable on the network such as a server name and so forth.

The monitoring target management unit 103 of the server 10 that receives via the communication processing unit 102 the acquisition request of the monitoring control device's network address information transmitted from the communication processing unit 205, searches for the ID of the monitored device from pieces of monitoring target information stored on the storage unit 101, and sends, as a response, the address information of the monitoring control device with this monitored device as a monitoring target back to the operation terminal 20 (a first notifying function).

The communication management unit 204 receiving this response via the communication processing unit 205 of the operation terminal 20, issues the content of the request asked for to the corresponding to monitoring control device via the communication processing unit 205 (a monitoring control function). This operation eliminates, in the operation terminal 20, a necessity of managing the specified information of the monitored device as a monitoring target.

Subsequently, a more specific explanation will be given by exemplifying a case of performing the control of the monitored device 52 having a device name [NE#002] and an ID [002] from the side of the operation terminal 20. In the operation terminal 20, the communication management unit 204 receiving a request for the control of the monitored device 52 having the ID=0002 from the operator via the GUI interface module 202, at first takes out the head address information of the monitoring target management server information from the storage unit 201.

Herein, the communication management unit 204 acquires a piece of address information [192.168.0.2], and requests the corresponding server (SRV1) 10 to acquire the specifying information of the monitoring control device by use of ID=002 as additional information. Note that the device name [NE#002] of the monitored device may also be used as the additional information.

The monitoring target management unit 103 of the server (SRV1) 10 receiving this acquisition request searches for the monitoring control device having the monitoring target specified by the additional information ID=002 from within the monitoring target information on the storage unit 101. Herein, the monitoring target management unit 103 obtains a piece of address information [192.168.0.102] as a result of searching, and notifies the operation terminal 20 of this piece of address information as a response. The communication management unit 204 of the operation terminal 20 receiving this response requests the monitoring control device (Ops-B) 40 to control the monitored device 52.

SECOND OPERATIONAL EXAMPLE

Referring next to FIGS. 2, 3, 6 and 8, in the case of selecting the monitored device that is monitored-controlled on the operation terminal 20, the communication management unit 204 requests the server (SRV1) 10 to acquire the specifying information of the monitored device in response to a request given from the GUI interface module 202 as in the first operational example.

The monitoring target management unit 103 of the server 10, when receiving this acquisition request, acquires, based on the monitoring target information on the storage unit 101, an ID and a name of the monitored device set as a monitoring target by the monitoring control device from the address information of the designated monitoring control device, and sends them as a response back to the operation terminal 20 (a second notifying function). This operation eliminates a necessity of managing the specifying information of all the monitored devices in the operation terminal 20.

To describe it in greater detail, in the operation terminal 20, in the case of selecting the monitored device that is monitor-controlled from a list of all the monitored devices, the GUI interface module 202 of the operation terminal 20 requests the communication management unit 204 to acquire the specifying information of the monitored device in a way that sets all the monitoring control devices as a target.

The communication management unit 204 requests the server 10 to acquire the specifying information of the monitored device through the procedure in the first operational example described above. At this time, a piece of information [all the monitored devices] is added as additional information.

In response to this acquisition request, the monitoring target management unit 103 of the server (SRV1) 10 acquires, from the monitoring target information on the storage unit 101, the monitored devices specified by the additional information, which are set as monitoring targets by the monitoring control device, and sends the monitoring target information as a response back to the operation terminal 20. In this example, the IDs and names of the monitored devices are [001, NE#001], [002, NE#002], [101, NE#101], [200, NE#200], and these pieces of information are sent back as a response.

THIRD OPERATIONAL EXAMPLE

Referring next to FIGS. 2, 3, 6 and 9, in the case of directly controlling the monitoring control device from the operation terminal 20, in response to a request from the GUI interface module 202, the communication management unit 204 requests the server 10 to acquire the specifying information of all the monitoring control devices in accordance with the first operational example.

The monitoring target management unit 103 of the server 10, in the case of receiving this acquisition request, acquires the address information of all the monitoring control devices from the monitoring target information on the storage unit 101, and sends the address information as a response back to the operation terminal 20 (a third notifying function). This operation eliminates a necessity of managing the specifying information of all the monitoring control devices in the operation terminal 20.

To describe it in greater detail, in the operation terminal 20, in the case of selecting the monitoring control device from a list of the monitoring control devices such as registering a monitored device afresh, the GUI interface module 202 of the operation terminal 20 asks the communication management unit 204 to make a request for acquiring the specifying information of all the monitoring control devices. The communication management unit 204 requests the server 10 to acquire the specifying information of all the monitoring control devices through the procedure in the first operational example.

The monitoring target management unit 103 of the server (SRV1) 10, in response to this acquisition request, acquires the address information of all the monitoring control devices from the monitoring target information on the storage unit 101, and sends the address information as a response back to the operation terminal 20. In this example, pieces of address information [192.168.0.101], [192.168.0.102] of all the monitoring control devices are sent back as a response.

FOURTH OPERATIONAL EXAMPLE

Referring next to FIGS. 2, 3, 6 and 10, if a request from the operation terminal 20 comes to an abnormal end due to some cause in the communications between the operation terminal 20 and the server (SRV2) 10, the communication management unit 204 of the operation terminal 20 searches for again the monitoring target management server information from the storage unit 201, then acquires, based on the predetermined rule, the address information of the server 15 to which the request is to be transmitted next, and gives the request having come to the abnormal end to the thus acquired server (a second acquisition function). This enables the processing to continue even when the abnormal state occurs in the server 15.

To explain it more specifically, the monitored device 52 having the ID [002] and the name [NE#002] is controlled from on the operation terminal 20, and, if the request for the server (SRV1) 10 comes to the abnormal end, the communication management unit 204 of the operation terminal 20 executes the processes in the first operational example and requests the server 15 provided within the monitoring control device 30 to acquire the specifying information of the monitoring control device.

Herein, if the acquisition request comes to the abnormal end, the communication management unit 204 takes out again the address information of the second server 15 from the monitoring target management server information. Herein, the communication management unit 204 obtains from the storage unit 201 a piece of address information [192.168.0.101] of the monitoring target management server 15 provided as a server function unit in the monitoring control device (OpS-A) 30.

Therefore, the communication management unit 204 requests the monitoring target management server 15 in the monitoring control device 30 to acquire the address information of the monitoring control device with ID=002 used as the additional information, thereby enabling the processing to continue.

OTHER EXAMPLES OF ARCHITECTURE OF MONITORING CONTROL NETWORK SYSTEM

Figure 11:
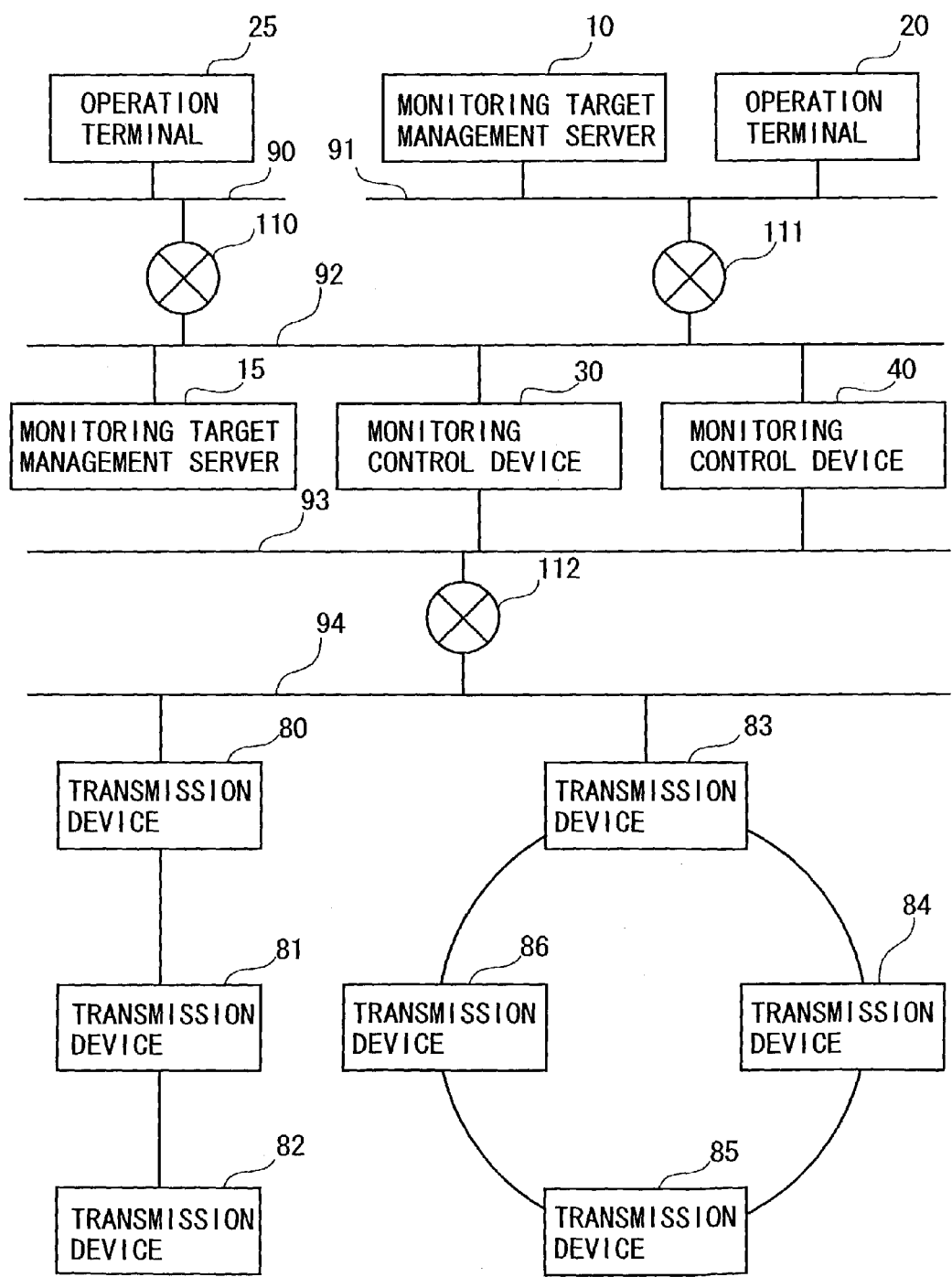
FIG. 11 is a block diagram showing an example of another architecture of the monitoring control network system in one embodiment of the present invention.

FIG. 11 shows first other example of the architecture of the monitoring control network system. This monitoring control network system is provided with two pieces of operation terminals 20, 25 and two pieces of monitoring target management servers 10, 15.

The servers 10, 15 and the operation terminals 20, 25 have basically the same functions and configurations as those in the monitoring control network system explained referring to FIGS. 2 and 3. Further, the server 15 and the operation terminal 25 respectively have redundant architectures with respect to the server 10 and the operation terminal 20.

In FIG. 11, the reference numerals 90, 91, 93, 94 represent LANs such as Ethernet, and the numerals 110, 111, 112 designate routers or gateways. Transmission devices 80, 81, 82 serving as monitored devices under the monitor-control of the monitoring control devices are connected in vertical series to the LAN 94, and transmission devices 83, 84, 85, 86 configuring a ring network are connected to the LAN 94. The transmission devices 80, 81, 82 and the transmission devices 83, 84, 85, 86 are different in their types and disposition areas.

Figure 12:
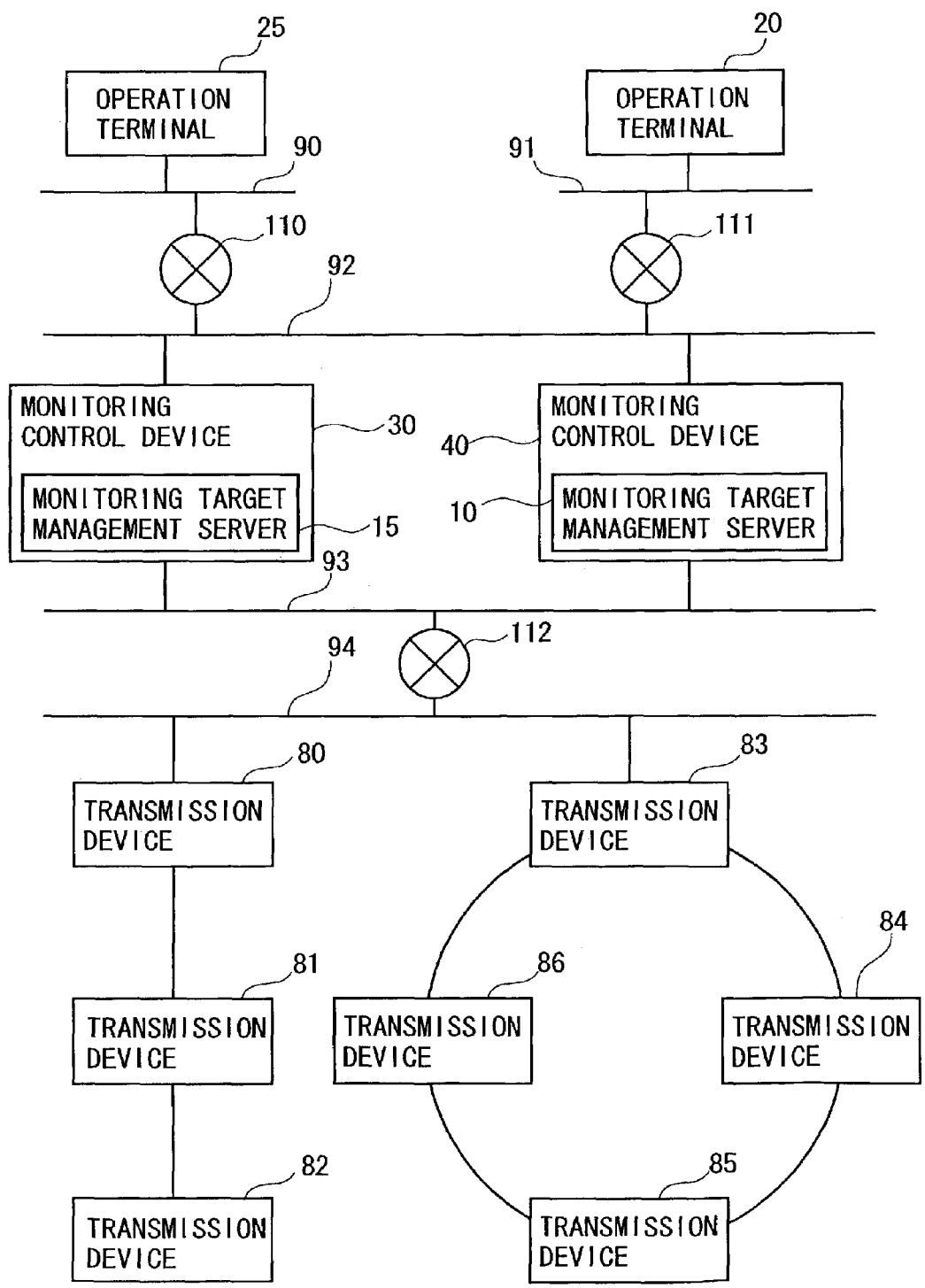
FIG. 12 is a block diagram showing an example of still another architecture of the monitoring control network system in one embodiment of the present invention.

FIG. 12 shows second other example of the architecture of the monitoring control network system. this monitoring control network system is provided with two pieces of operation terminals 20, 25 and two pieces of monitoring target management servers 10, 15. The monitoring target management servers 10, 15 are provided respectively as server function units within the monitoring control devices 40, 30. Other configurations are the same as those in the monitoring control network system shown in FIG. 11. This architecture enables a decrease in the number of network component devices by incorporating the functions of the monitoring target management servers 10, 15 into the monitoring control devices 40, 30.

Although only a few embodiments of the present invention have been described in detail above, those skilled in the art will readily appreciate that many modifications are possible in the preferred embodiments without departing from the novel teachings and advantages of this invention. Accordingly, all such modifications are intended to be included within the scope of the present invention as defined by the following claims.

What is claimed is:

1. A monitoring control network system comprising:
   at least two monitoring control devices each having at least one slave monitored device configuring a network, and monitoring and controlling said slave monitored device;
   at least one operation terminal monitoring and controlling a corresponding slave monitored device through said monitoring control device; and
   at least one monitoring target management server including a storage unit and a notifying unit, said storage unit storing monitoring target information including slave monitored device specifying information for specifying each of said slave monitored devices and monitoring control device specifying information for specifying each of said monitoring control devices monitoring and controlling said slave monitored device specified by said slave monitored device specifying information, said notifying unit accepting a first acquisition request of the specifying information of said monitoring control device from said operation terminal, said first acquisition request including said slave monitored device specifying information of a target slave monitored device which is to be monitored and controlled by said operation terminal, said notifying unit notifying said operation terminal of the specifying information of said monitoring control device which monitors said target slave monitored device designated by said slave monitored device specifying information included in said first acquisition request, on the basis of said monitoring target information stored in said storage unit, wherein said operation terminal performs communications with said monitoring control device acquired through the notification, and executes monitoring and controlling said target slave monitored device.

2. A monitoring control network system according to claim 1, wherein said monitoring control device, said operation terminal and said monitoring target management server are connected to each other via the network.

3. A monitoring control network system according to claim 1, wherein said monitoring control device, said operation terminal and said monitoring target management server are connected to each other via a plurality of networks.

4. A monitoring control network system according to claim 1, wherein said notifying unit of said monitoring target management server accepts a second acquisition request of the specifying information of said slave monitored device from said operation terminal in order to make a monitoring target and controlling target selectable in said operation terminal, said slave monitored device being monitored and controlled by a designated monitored control device which is specified by said monitoring control device specifying information included in said second acquisition request, and notifies said operation terminal of the specifying information of said slave monitored device set as the monitoring target by said designated monitoring control device on the basis of the monitoring target information.

5. A monitoring control network system according to claim 1, wherein said notifying unit of said monitoring target management server accepts a third acquisition request of the specifying information of all of said monitoring control devices from said operation terminal in order to enable said operation terminal to perform communications with an arbitrary monitoring control device, and notifies said operation terminal of the specifying information of all of said monitoring control devices.

6. A monitoring control network system according to claim 1, wherein at least one of said monitoring target management server is provided in said monitoring control device.

7. A monitoring control network system according to claim 1, wherein said operation terminal includes a storage unit storing specifying information of said monitoring target management server, and an acquisition unit acquiring from said storage unit a piece of specifying information of said monitoring target management server.

8. A monitoring control network system according to claim 7, wherein said operation terminal further includes an acquisition unit acquiring from said storage unit, if a request for one of said monitoring target management servers falls into a failure, a piece of specifying information of other monitoring target management server to which the request is to be given next.

* * * * *